Figure 1:
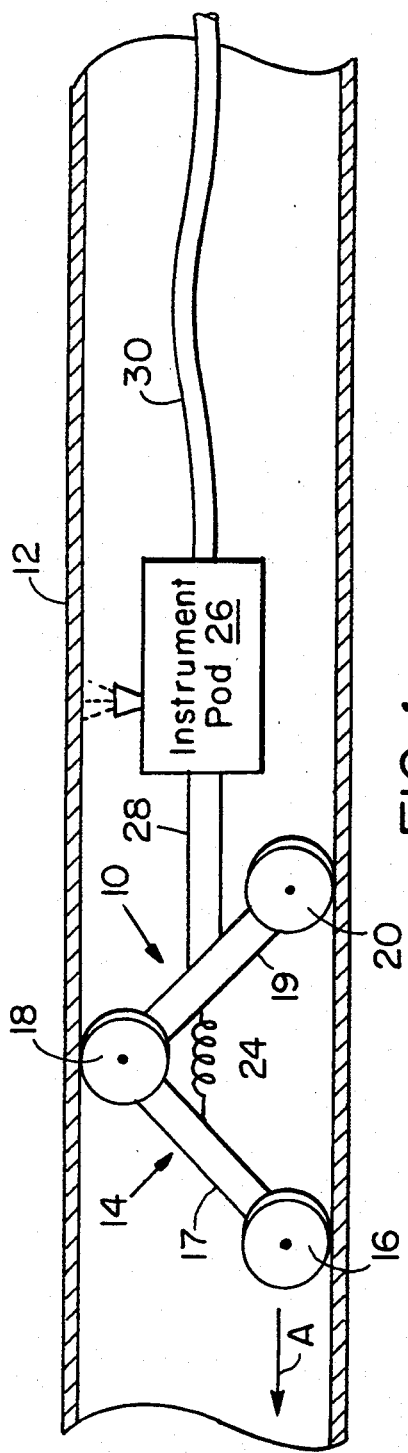

United States Patent [19]
Olander et al.

[11] Patent Number: 5,423,230
[45] Date of Patent: Jun. 13, 1995

[54] LONG RANGE INTERNAL PIPE INSPECTION MAINTENANCE SYSTEM

[75] Inventors: Ross Olander, Framingham; Mark Snyder; Allan Fisk, both of Needham, all of Mass.

[73] Assignee: Foster-Miller, Inc., Waltham, Mass.

[21] Appl. No.: 223,828

[22] Filed: Apr. 6, 1994

Related U.S. Application Data

[63] Continuation of Ser. No. 59,080, May 5, 1993, abandoned.

[51] Int. Cl.⁶ .............................................. H04N 7/18
[52] U.S. Cl. .................................................. 73/865.8
[58] Field of Search ............... 73/623, 865.8, 866.5; 324/220, 221; 358/100; 378/60; 356/241; 33/544–544.3

[56] References Cited

U.S. PATENT DOCUMENTS

| | | | |
|---|---|---|---|
| 3,603,264 | 1/1971 | Arx | 104/138.2 |
| 3,994,173 | 11/1976 | Ward et al. | 73/866.5 |
| 4,050,384 | 9/1977 | Chapman | 324/220 |
| 4,178,875 | 12/1979 | Moshetti | 324/220 |
| 4,722,001 | 1/1988 | Rohrich et al. | 324/220 |
| 5,084,764 | 1/1992 | Day | 73/865.8 |
| 5,174,164 | 12/1992 | Wilheim | 73/866.5 |

*Primary Examiner*—Robert Raevis
*Attorney, Agent, or Firm*—Joseph S. Iandiorio; Kirk Teska; Iandiorio and Kirk Teska

[57] ABSTRACT

A long range internal pipe inspection/maintenance system comprising an elongated, flexible push snake including an outer protective sleeve for insertion in the pipe and for carrying pipe inspection equipment, and a driven mechanism for applying tension to the snake to facilitate movement of the snake through the pipe to increase the snake inspection range.

10 Claims, 1 Drawing Sheet

U.S. Patent      June 13, 1995      5,423,230

LONG RANGE INTERNAL PIPE INSPECTION MAINTENANCE SYSTEM

This is a continuation of application Ser. No. 08/059,080, filed May 5, 1993, now abandoned.

FIELD OF INVENTION

This invention relates to a long range internal pipe inspection/maintenance system that is particularly adapted for increasing the current range of pipe push snakes to 600 feet.

BACKGROUND OF INVENTION

Push snakes for the inspection and internal maintenance of gas, sewer and water piping systems currently have a maximum range of approximately 300 feet. These push snakes are typically somewhat flexible and carry an instrument pod or other pipe inspection equipment at their head. For a particular type of snake, the maximum inspection range is not constant, and is determined by a number of factors including the geometry of the piping system, the number and type of fittings in the piping system, the coefficient of sliding friction at the snake/pipe interface, and the amount of debris in the pipe.

For a given combination of the above factors, there will be some length at which the compressive push force required to move the snake and instrument pod is sufficiently large that the snake buckles. Increasing the push force above this level will only cause more of the snake to kink and pile up without any increase in the effective inspection range. Accordingly, the range of push snake inspection systems is inherently limited.

SUMMARY OF INVENTION

It is therefore an object of this invention to provide an increased-range push snake-type pipe inspection/maintenance system.

It is a further object of this invention to provide such a system in which the onset of buckling of the pipe snake is delayed.

It is a further object of this invention to provide such a system which can more easily negotiate turns in the pipe being inspected.

This invention results from the realization that the range of standard push snake pipe inspection/maintenance systems can be increased dramatically by applying a pulling force to the head of the snake to reduce the magnitude of compressive push force needed to propel the snake through the pipe and thereby decrease the likelihood of snake compressive buckling.

This invention features a long range internal pipe inspection system comprising an elongated, flexible push snake including an outer protective sleeve for insertion in the pipe and for carrying the pipe inspection equipment, and means for applying tension to the snake to facilitate movement of the snake through the pipe to increase the snake inspection range. The tension may be applied by a driven mechanism such as a pipe crawler. The driven mechanism may be self powered or may draw power through the push snake. Preferably, the driven mechanism includes a plurality of driven wheel means. The driven mechanism may also include means for negotiating turns in the pipe. The push snake protective sleeve preferably is made from a polymer such as nylon, and may carry wires and fluid delivery tubes. The snake is preferably stiffened with an internal member such as a stiffening rod. The means for applying tension may include means for pulling the snake through the pipe, which may be attached to an end of the snake. The pod may carry inspection equipment such as cameras, and maintenance equipment such as fluid delivery means.

DISCLOSURE OF PREFERRED EMBODIMENT

Figure 2:
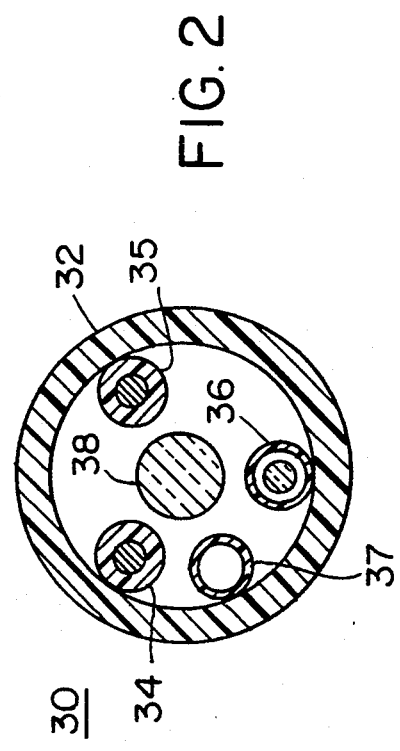

Other objects, features and advantages will occur to those skilled in the art from the following description of a preferred embodiment and the accompanying drawings in which:

FIG. 1 is a schematic view of a long range internal pipe inspection/maintenance system according to this invention moving through a pipe; and FIG. 2 is a cross sectional view of a preferred form of the push snake of the internal pipe inspection/maintenance system of FIG. 1.

This invention may be accomplished in a long range internal pipe inspection/maintenance system which includes an elongated, flexible push snake having an outer protective sleeve for insertion in the pipe and for carrying pipe inspection equipment. Further included is some means for applying tension to the snake to facilitate movement of the snake through the pipe to increase the snake inspection range.

There is shown in FIG. 1 long range internal pipe inspection system 10 according to this invention. System 10 includes standard push snake 30 having pipe inspection instrument pod 26 at its head. The object of the snake is to move instrument pod 26 through the pipe in the direction of arrow A so that interior inspection and/or maintenance of pipe 12 may be made. Pod 26 may carry inspection equipment such as cameras, and maintenance equipment such as fluid delivery nozzle 27. In currently used push snake technology, the inspection range is inherently limited because the push snake cannot take the compressive push force necessary to move the instrument pod long distances through pipe 12.

The range of snake 30 is increased in this invention by providing means 14 for applying tension to snake 30 to facilitate movement of snake 30 through pipe 12. It is not necessary that the tension be applied at the head of the snake as shown in FIG. 1, although this is preferable because such an arrangement provides a tensile force along the entire length of snake 30 as opposed to just a portion of its length. The tension is applied in this case by pipe crawler 14 of the type described and shown in U.S. Pat. No. 5,172,639, issued Dec. 22, 1992, incorporated herein by reference. Pipe crawler 14 has driven wheels 16, 18 and 20 interconnected by member 17 and 19, which are themselves interconnected by tension spring 24. Members 17 and 19 pivot on the central point of wheel 18 under the tension applied by spring 24 so that wheels 16 and 20 are in contact with one side of pipe 12, and wheel 18 is in contact with the other side of pipe 12. Preferably, each wheel 16, 18 and 20 has its own motor, not shown, to drive the wheels individually to increase the tensile force applied by crawler 14. Alternatively, any one or more of the wheels can be driven. Pipe crawler 14 may be self-powered, for example with a battery carried in instrument pod 26 or elsewhere, or may be externally powered through wires running through the interior of snake 30. Structural member 28 is included for connecting instrument pod 26 and thus snake 30 to pipe crawler 14.

Pipe crawler 14 may be made to have the capability of negotiating turns in the pipe by providing means for pivoting one or more of wheels 16, 18 and 20 about a vertical axis, FIG. 1, so that pipe crawler 14 may be steered around corners, as set forth in the application incorporated by reference.

A preferred embodiment of snake 30 is shown in cross section in FIG. 2. The snake includes a flexible outer protective sleeve 32 made of nylon or another polymer. Tubing 32 may carry one or more wires 34 through 36 which carry the power and signals necessary for operation of instrument pod 26 and also the power for driving pipe crawler 14 in embodiments in which the pipe crawler is not self-powered. One or more of the wires may be fiber optics. Also included may be one or more fluid delivery tubes 37 to carry fluid leak sealants such as epoxies that can be sprayed onto the inside of the pipe to seal a leak. Fiberglass stiffening rod 38 provides the stiffness to accept a compressive pushing force, while maintaining sufficient flexibility to be coiled for storage, and to bend around pipe corners. The remaining annular space between tube 32 and member 38 may be filled with a filler material.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A long range internal pipe inspection/maintenance system, comprising:

an elongated, flexible push snake including an outer protective sleeve for insertion in the pipe, said push snake capable of transmitting compressive forces for pushing pipe inspection equipment within the pipe; and means for applying tension to said snake to facilitate movement of said snake through the pipe to increase the snake inspection range including a wheeled pipe crawler proximate the terminal end of said snake, said wheeled pipe crawler having wheels interconnected by support means and including means for biasing said wheels against the interior the pipe.

2. The long range internal pipe inspection system of claim 1 in which said crawler includes driving means.

3. The long range internal pipe inspection system of claim 2 in which said crawler is self-powered.

4. The long range internal pipe inspection system of claim 2 in which said crawler draws power through said push snake.

5. The long range internal pipe inspection system of claim 1 in which said push snake protective sleeve includes a polymer material.

6. The long range internal pipe inspection system of claim 1 in which said push snake includes means for carrying electrical signals.

7. The long range internal pipe inspection system of claim 1 in which said push snake includes means for carrying a fluid.

8. The long range internal pipe inspection system of claim 7 further including means for delivering said fluid to the inside of the pipe.

9. The long range internal pipe inspection system of claim 1 in which said push snake includes stiffening means.

10. The long range internal pipe inspection system of claim 9 in which said stiffening means includes a flexible rod member.

* * * * *